UNITED STATES PATENT OFFICE.

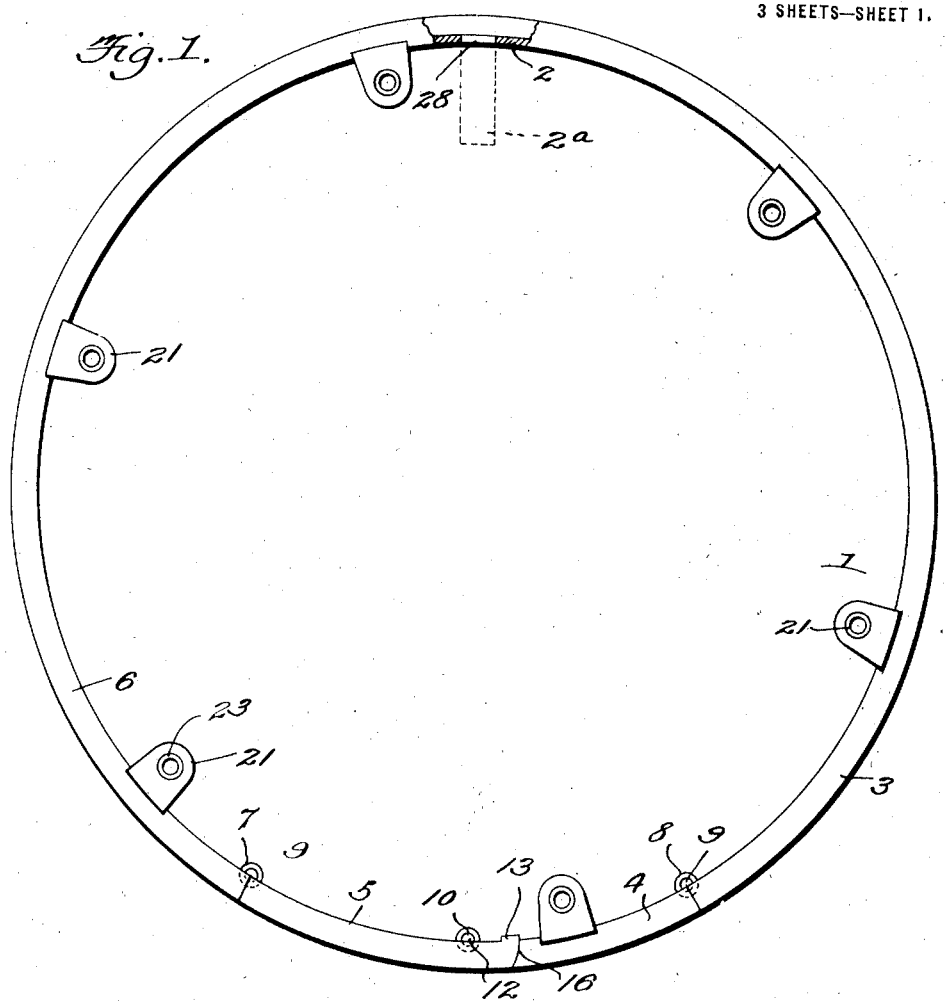
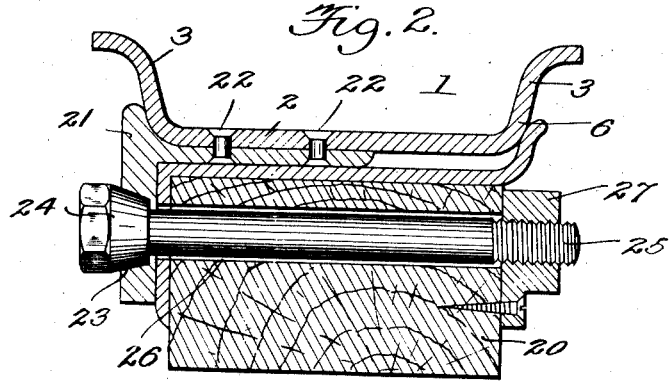

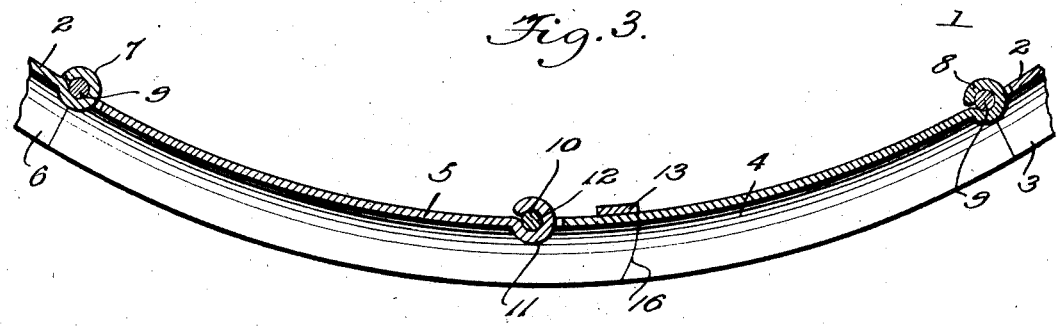
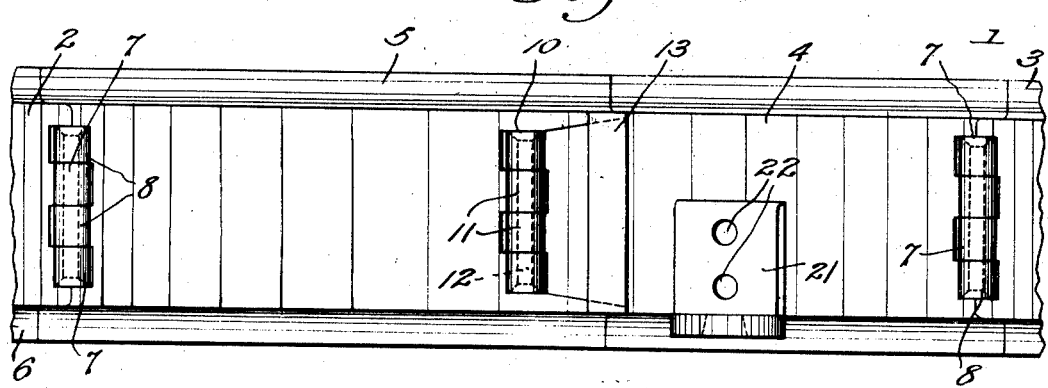
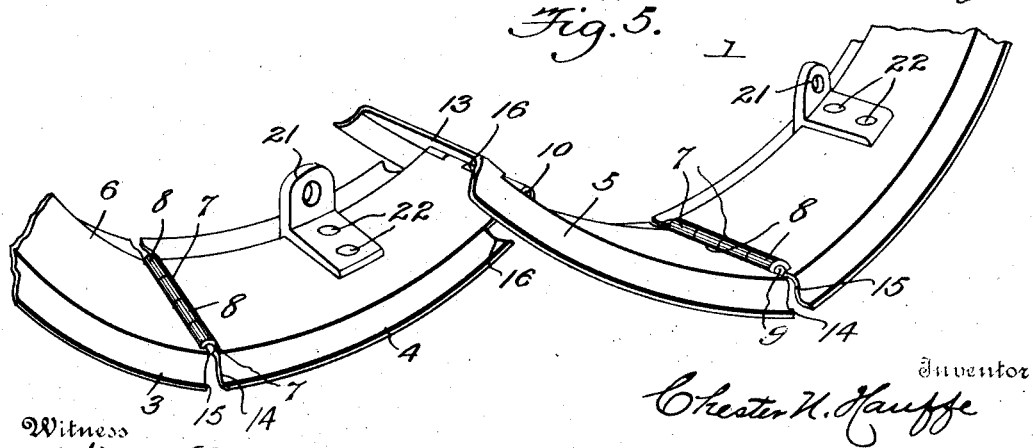

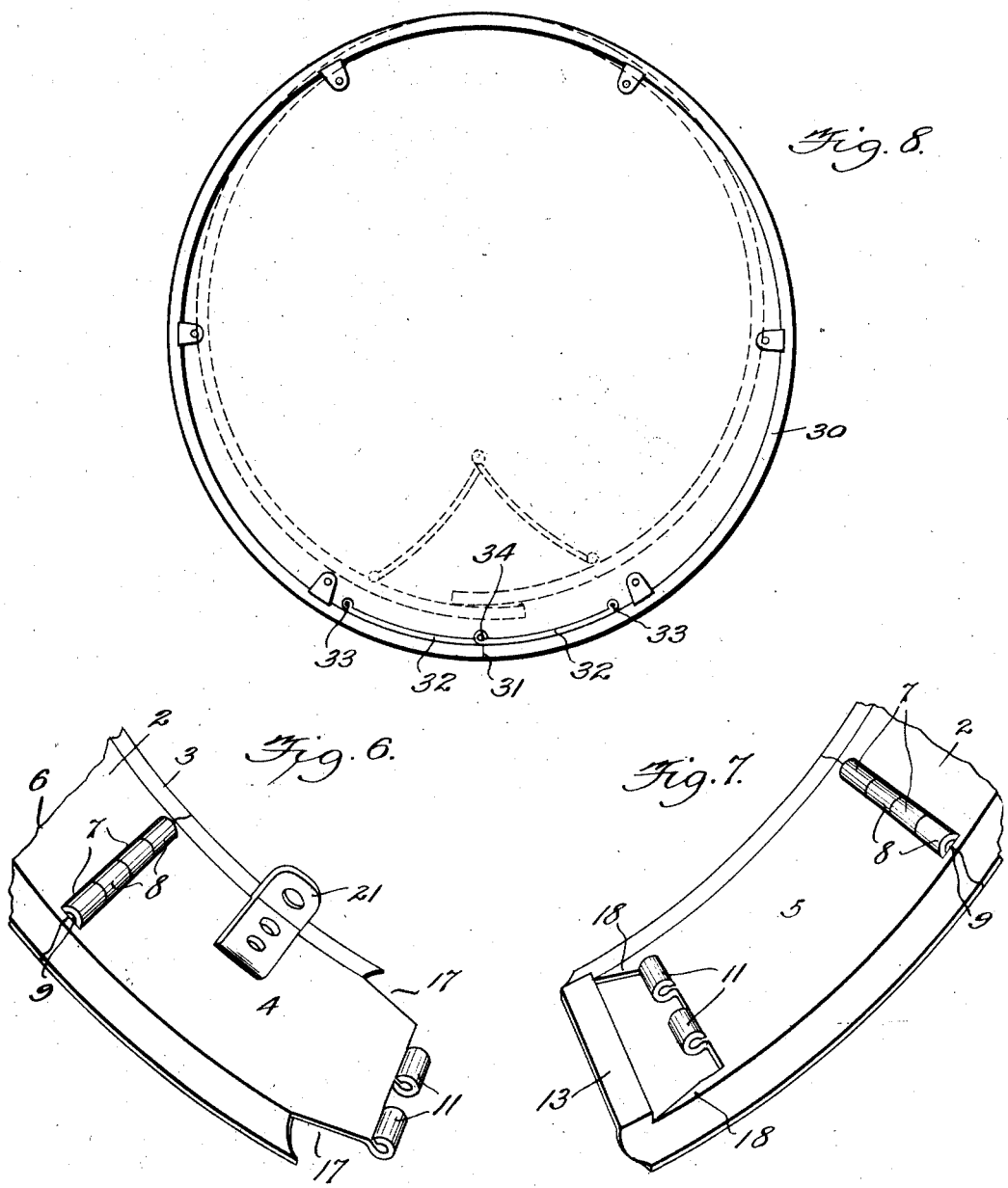

CHESTER N. HAUFFE, OF COLUMBUS, OHIO.

TIRE-RIM.

1,341,124.  Specification of Letters Patent.  Patented May 25, 1920.

Application filed February 17, 1919. Serial No. 277,388.

*To all whom it may concern:*

Be it known that I, CHESTER N. HAUFFE, a citizen of the United States, residing at Columbus, in the county of Franklin and State of Ohio, have invented certain new and useful Improvements in Tire-Rims, of which the following is a specification.

This invention relates to tire rims, and is particularly directed to rims of the type employed to detachably connect pneumatic tire structures with a vehicle wheel.

The general object of the invention is to provide a demountable wheel rim wherein are embodied novel and improved features of construction for easily and expeditiously effecting the removal of a tire from the rim's periphery, and to accomplish this result without the use of tools or other prying elements.

In carrying out the invention, use is made of a rim structure wherein is provided a plurality of hingedly connected segments, which when in a tire retaining position will be held in substantially locked relation by virtue of the inherent resiliency of the rim body but which are so constructed that the mere dropping of the rim upon the ground will be sufficient to effect their folding so that the working diameter of the rim will be sufficiently reduced to permit of the removal of an associated tire, and conversely, to effect the securing of a tire to the rim, the hinged sections of the latter may be locked in true circumferential relation by the mere application of foot pressure thereto.

With these and other objects in view, as will appear as the description proceeds, the invention accordingly consists in the novel features of construction, combination of elements and arrangement of parts, hereinafter fully described and having the scope thereof indicated in the appended claim. In the drawings, forming a part of this specification, and in which similar characters of reference denote like and corresponding parts:

Figure 1 is a side elevation of the tire rim comprising the preferred form of the invention.

Fig. 2 is a transverse sectional view thereof, showing its application to the felly of a wheel.

Fig. 3 is a vertical sectional view taken through the hinged sections of the rim, and showing the latter in their circumferentially assembled relation.

Fig. 4 is a fragmentary plan view of the hinged sections.

Fig. 5 is a detailed perspective view disclosing sections in their collapsed positions.

Fig. 6 is a detailed perspective view of one of the hinged sections.

Fig. 7 is a similar view of the other section, and

Fig. 8 is a slightly modified form of the rim, disclosing a type which is particularly adaptable for use in connection with tires of the clencher type.

In the preferred form of my invention, I employ a demountable tire rim 1, which is preferably formed from a resilient metal, and comprises a substantially annular base portion 2 and integral and laterally flaring tire retaining flanges 3, the rim 1 being preferably used in connection with pneumatic tires of the so called straight sided variety.

To permit of the convenient and quick removal of a tire from its operative position upon the rim 1, or the quick insertion of the tire in position upon said rim, the latter is provided with a plurality of circumferentially alined hinged sections 4 and 5, which operate when in an extended position to render the rim 1 annularly true to receive and lock a tire in position upon the rim, but when said sections are collapsed, to effect a reduction in the working diameter of the rim so that the removal of the tire therefrom may be quickly accomplished.

To effect this hinged construction, the body 6 of the rim is cut away to provide room for the reception of the sections 4 and 5. The edges of the body, bordering this cut away portion, are provided with integral turned over tongues 7, which are adapted to coöperate with similarly formed tongues 8 provided upon the outer ends of the sections 4 and 5, and which coöperate to provide a hinged construction between the body 6 and said sections 4 and 5. Pintles 9 are arranged to pass through the tongues to complete the hinged structure and to permit of free pivotal movement in an inward direction on part of the collapsible sections.

The meeting or adjacent edges of the hinged sections are also hingedly connected as at 10. To accomplish this, the sections 4 and 5 are provided with turned over tongue portions 11, through which a pintle 12 passes to effect their pivotal union and to also limit the collapsing movement of the sections.

The free end of the section 5 is provided with an integral overlapping strip 13, which when the sections assume their extended or operative positions, will engage with the upper or inner surface of the section 4 so as to arrest the outward or extended movement on part of said sections, thus relieving the edges 14, which coöperate with the ends 15 of the rim body 6, of their locking pressure and strain. It will also be observed, upon reference to Fig. 3, that the meeting edges 16 of the flanges 3 carried by said sections are curved on a radius defined by the axis of the pintle 12, thus permitting the sections to be readily collapsed or extended without relative interference. From the description presented, it will be observed that when the sections 4 and 5 are pressed into circumferential registration with the rim 1, the inherent resiliency of the rim body will tend to force and maintain the said sections in their active or extended positions, as the resilient pressure exerted by the rim body will be exerted at a point above the central hinge 10, so that the central or meeting portions of said sections will be forced outwardly and thus locked in annular alinement with the body 6. However, to collapse the rim sections, or the rim as a whole, it is simply necessary to drop the rim and its associated tire upon a fixed object, a floor for instance, and this force will be sufficient to raise the hinge 10 above the center of spring pressure exercised by the rim body, and this action effects the complete collapsing of said sections and a consequent reduction in diametrical area of the rim 1, thereby permitting of the quick removal or insertion of a tire relative to the rim 1.

To effect a close union of the meeting ends of the sections 4 and 5, when the latter are extended and to provide a substantial joint therefor, the section 4 has its outer end cut away as at 17 and these cut away portions are adapted to receive similarly formed extensions 18 provided on the adjacent end of the section 5. This results in a construction of marked rigidity and yet will permit of free relative movement between the meeting ends of the sections. The strip 13 serves to unite the extensions 18 so as to generally brace and strengthen the construction of the latter.

From the foregoing description, taken in connection with the accompanying drawings, it will be seen that there is provided a rim structure characterized by ease of operation, simplicity of construction and freedom from complicated parts. By virtue of this hinged construction set forth, it will be apparent that no tools are necessary to permit of the insertion of a pneumatic tire upon the rim or to effect the removal of the tire therefrom. This does away with the liability of pinching or injuring the fabric of the tire structure, eliminates injury to the rubber tube of the tire and prevents personal injury to the operator or repair man. Tire changes may be effected in but a minimum of time and moreover the parts of the rim are so constructed as to avoid the necessity of stooping over in effecting the operation of the rim. Again, true and absolute concentricity of the rim is provided when the hinged sections are in their active or extended positions.

To secure the rim 1 in position upon the felly 20 of the wheel, I preferably employ a plurality of circumferentially spaced securing cleats 21 which are riveted or otherwise secured as at 22 to the inner side of the body 6 and the section 4. These cleats are provided with tapering openings 23, which are adapted to receive similarly shaped heads 24 provided upon the ends of fastening bolts 25. These bolts pass through openings 26 formed in the felly 20, and are adapted to have their threaded ends engaged with internally threaded nuts 27 secured to the felly 20. By this construction, it is possible to securely connect the rim 1 in position upon a vehicle wheel 1 without resorting to the use of attaching lugs or other wedging devices, and it will be noted that the rim is locked upon the felly 20 in such manner as to prevent relative circumferential movement therebetween. This construction is not afforded by the use of lugs which, owing to their manner of association with the felly 20, will permit of limited circumferential movement, and which has a tendency to cause excessive wear on their associated tires. However, through the use of the structure described, movement of the rim 1 in unison with the wheel or felly 20 is completely insured and excessive wear on tires eliminated. Again, the cleats 21 are riveted or permanently carried by the rim. This prevents their loss and precludes the necessity of carrying extra parts. The rim 1 is formed with an opening 28 which is preferably located in diametrical alinement with the pintle 12. And in this opening 28, the valve $2^a$ of a tire is adapted to be inserted, whereby when the rim is in operation, said valve $2^a$ will counterbalance the weight of the pintles 9 and 12, thus serving to maintain the balance of the rim and to avoid extra weight in isolated parts of its periphery.

In the modified form of the invention shown in Fig. 8, the rim 30 is of the type employed in connection with the so called clencher type of tires, and necessarily departs from the structure shown in the preferred form in order to conform with the structural peculiarity of this form of tire. In this modified form, the rim is split as at 31, and overlying the split portion is a pair of hinged collapsing cleats 32. These cleats are hingedly connected at their outer ends to the rim 30 as at 33, and have their meeting ends united by means of a hinged construction 34. In this form, it is necessary to collapse the rim that a tool be inserted beneath the collapsing sections 32 to effect their collapse, so that the diametrical area of the rim will be sufficiently reduced, as indicated in dotted lines, to permit of the removal or insertion of a tire. However, to circumferentially expand the rim, it is simply necessary to exert foot pressure on the hinge 34 so that the rim itself will be expanded to assume an operative position. The spring pressure exerted by the rim 30 in this instance is precisely the same as that set forth in the preferred form, as it is obvious that when the hinges are folded to flatly engage with the rim, the pressure exerted by the latter will be above the hinge 34, thus causing the latter to closely adhere to the face of said rim and to maintain the annular configuration of the rim as a whole.

What I claim is:

A tire rim comprising a substantially resilient metallic body formed to include separated and spaced ends, a pair of hinged toggle sections having their outer portions hinged to said ends, the meeting ends of said sections being formed to include a tongue extension capable of lying within a recess formed in the other coöperative section, said extension being pivotally connected to the inner wall of said recess, shoulders formed with the adjacent ends of said sections and situated in offset relationship with respect to the hinge of said tongue extension and operating to arrest outward movement on the part of said sections, and a strip formed with the section in which the recess is provided, said strip being capable of engaging with the other complemental section to relieve said shoulders of the stresses set up by the expanding movements of the sections.

In testimony whereof I affix my signature.

CHESTER N. HAUFFE.